(12) United States Patent
Tanaka et al.

(10) Patent No.: US 6,574,181 B1
(45) Date of Patent: Jun. 3, 2003

(54) HOLOGRAPHIC MEMORY MEDIUM AND RECORDING APPARATUS USING THE SAME

(75) Inventors: Satoru Tanaka, Tsurugashima (JP);
Tomomitsu Kouno, Tsurugashima (JP);
Hideki Hatano, Tsurugashima (JP);
Yoshihisa Itoh, Tsurugashima (JP);
Hajime Matsushita, Tsurugashima (JP);
Takashi Yamaji, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/535,289

(22) Filed: Mar. 24, 2000

(30) Foreign Application Priority Data

Mar. 26, 1999 (JP) .......................................... 11-083849

(51) Int. Cl.[7] .................................................. G11B 7/00
(52) U.S. Cl. ........................................................ 369/103
(58) Field of Search ............................ 369/103, 275.1, 369/275.2, 275.3, 275.4; 359/3, 1, 22

(56) References Cited

U.S. PATENT DOCUMENTS 5,210,625 A * 5/1993 Moss et al. ..................... 359/1
5,698,344 A * 12/1997 Bai et al. ........................ 359/3
5,844,700 A * 12/1998 Jeganathan .................... 359/22

* cited by examiner

Primary Examiner—Thang V. Tran
Assistant Examiner—Bach Vuong
(74) Attorney, Agent, or Firm—Perman & Green, LLP

(57) ABSTRACT

Disclosed are a holographic memory medium for use in a holographic memory system, which can prevent generation of stray light of a gating beam at the time of recording information, and a recording apparatus which uses this memory medium. This memory medium records an information signal carried by a signal beam as a coherent reference beam and the signal beam enter the memory medium with a gating beam being present. The memory medium has at least a first surface and a second surface parallel to each other and comprises an antireflection coat, formed on the first surface, for preventing reflection of the gating beam. The recording apparatus records an information signal using a holographic memory medium and comprises a light absorbing member of absorbing the gating beam coming through the memory medium.

8 Claims, 5 Drawing Sheets

HOLOGRAPHIC MEMORY MEDIUM AND RECORDING APPARATUS USING THE SAME

BACKGROUND OF THE INVENTION

1. Field of the Invention

The present invention relates to a holographic memory medium and a recording apparatus using this medium.

2. Description of the Related Art

A volume holographic memory system is one of digital information recording systems which use the principle of holography. This volume holographic memory system converts digital data or an information signal to a two-dimensional dot beam pattern with a contrast, adds a reference beam to this pattern, yielding an optical interference pattern, and records this optical interference pattern as two-dimensional data on a recording medium. For the recording medium is used a photorefractive crystal such as LN which has a cylindrical shape, a rectangular parallelepiped or the like.

As reproducing an information signal, the reference beam alone is irradiated on the recording medium to thereby reproduce an optical interference pattern and performs inverse transform on the optical interference pattern, yielding a dot beam pattern. The original data can be acquired by reconverting this signal to digital data by using an electronic circuit.

Because the same reference beam as used in the recording operation is irradiated on a recording medium in a reproducing operation, recorded information may be erased at the same time as information is reproduced. As one solution to such a problem, the beam power of the reference beam to be used in a reproducing operation is set lower than that needed in a recording operation. However, repeating the reproducing operation erases recorded information slightly though it occurs. In this respect, there has been a demand for a system which has less reproduction deterioration.

A two-color holographic memory system performs recording and reproducing operations using a combination of lights of different wavelengths by utilizing the intermediate level of optical excitation in a recording medium which is comprised of a photorefractive crystal. Specifically, a gating beam whose wavelength differs from that of the reference beam is used in such a way that information is recordable only when this gating beam and the reference beam are both irradiated on the recording medium. A reproducing operation is carried out by irradiating the reference beam alone on the recording medium while cutting off the gating beam. This prevents reproduction deterioration.

In the above two-color holographic memory system, if the gating beam is irradiated on the recording medium at a position different from a predetermined target position where information is to be recorded, the information signal recorded at the irradiated portion may be erased.

For instance, as the gating beam irradiated on the recording medium passes through the recording medium and emerges from the opposite side, part of the gating beam may be reflected at the emerging surface of the recording medium and may return inside the recording medium. At the surface of the recording medium where the gating beam has been irradiated, part of the gating beam may be reflected there and further reflected by the components of the recording apparatus to reach the recording medium again. Those stray lights may undesirably erase non-target recorded signals.

OBJECTS AND SUMMARY OF THE INVENTION

Accordingly, it is an object of the present invention to provide a holographic memory medium which can prevent generation of stray light of a gating beam at the time of recording information, and a recording apparatus which uses this memory medium.

To achieve the above object, according to one aspect of this invention, there is provided a holographic memory medium for recording an information signal carried by a signal beam as a coherent reference beam and the signal beam enter the memory medium with a gating beam being present, which memory medium has at least a first surface and a second surface parallel to each other and comprises an antireflection coat, formed on the first surface, for preventing reflection of the gating beam.

According to another aspect of this invention, there is provided a recording apparatus for recording an information signal using a holographic memory medium, which comprises light absorbing member of absorbing the gating beam coming through the memory medium.

DETAILED DESCRIPTION OF THE PREFERRED EMBODIMENTS

Preferred embodiments of the present invention will now be described with reference to the accompanying drawings.

Figure 1:
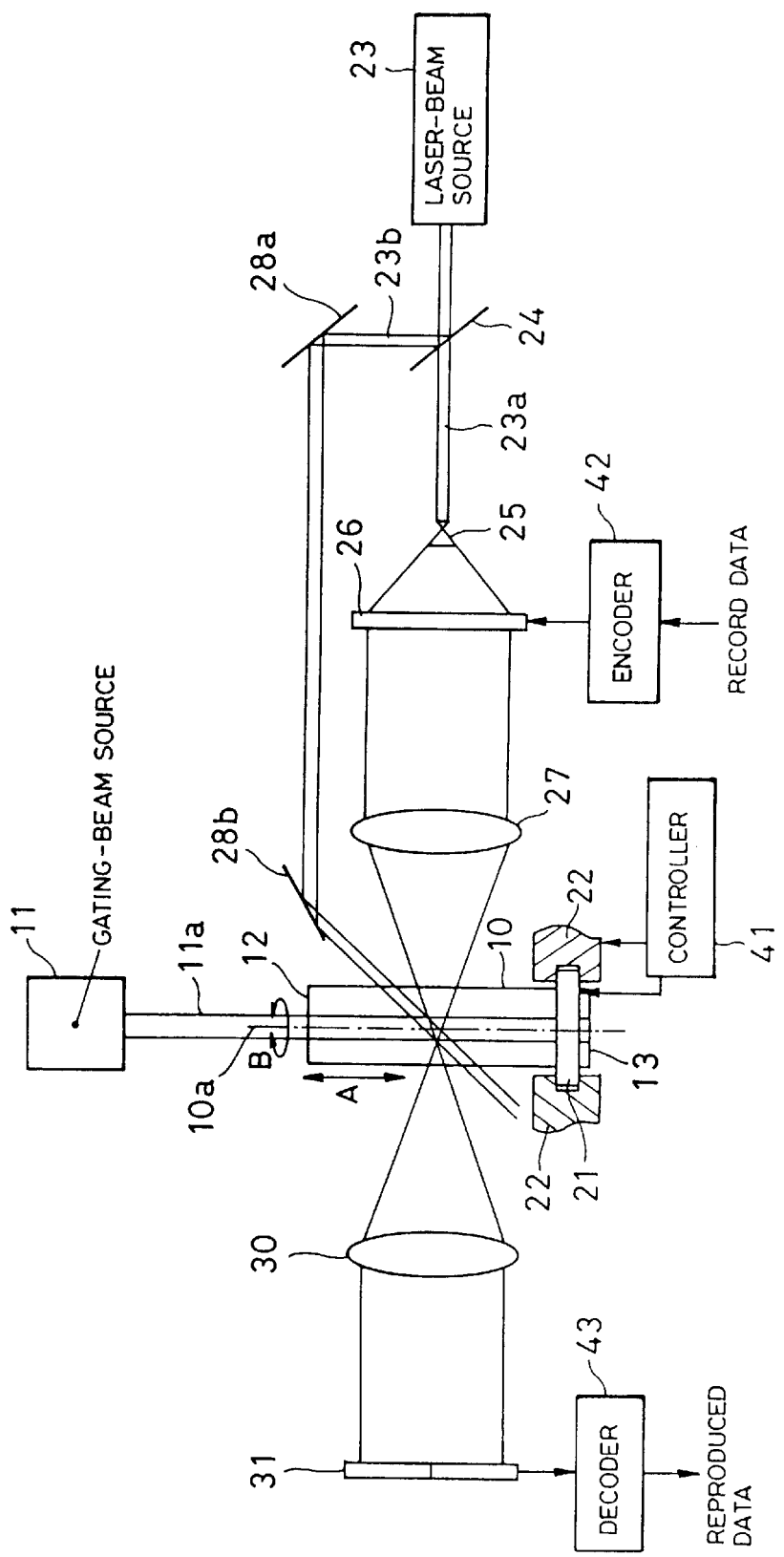
FIG. 1 is a structural diagram illustrating a recording apparatus embodying this invention.

According to a holographic memory device embodying this invention as illustrated in FIG. 1, which can prevent generation of stray light of a gating beam, a recording medium 10, comprised of a photorefractive crystal such as LN, is cylindrical and has its crystal axis 10a arranged in parallel to the direction of an arrow A. That is, the recording medium 10 has parallel top and bottom surfaces laid perpendicular to the direction of the arrow A. Located above the recording medium 10 is a gating-beam source 11 which emits a gating beam 11a downward in parallel to the center axis 10a of the recording medium 10. This gating-beam source 11 can irradiate a beam spot at any desired position in the recording medium 10 and has power high enough to cause optical excitation in the recording medium 10. For example, a super luminescent diode or the like is preferable as the beam source.

The recording medium 10 is supported at near the lower end portion from the sides. The recording medium 10 is securely fitted in a through hole formed in a ring-shaped gear 21 at the center. The peripheral edge of the ring-shaped gear 21 is held vertically by a holding block 22 via bearing means (not shown) in such a way that the ring-shaped gear 21 is slidable. Accordingly, the recording medium 10 is rotatable together with the ring-shaped gear 21 about the center axis 10a of the recording medium 10 in the direction of an arrow B. Unillustrated rotation means is engaged with the ring-shaped gear 21 whose rotation is controlled by a controller 41.

The holding block 22 can also be moved by unillustrated parallel moving means in the vertical direction indicated by the arrow A. The controller 41 also controls the positioning of the holding block 22.

A laser beam emitted from another beam source or a laser-beam source 23 is split into a signal beam 23a and a reference beam 23b by a beam splitter 24. After the beam size is expanded by a beam expander 25, the signal beam 23a enters a spatial light modulator (hereinafter called "SLM") 26.

Record data is sent to the SLM 26 after it is converted by an encoder 42 to an information signal of a sequence of data of a unit page corresponding to a two-dimensional page. The SLM 26 forms a dot matrix upon reception of this data. As the signal beam 23a passes the SLM 26, it is optically modulated in the state where it includes the information signal. Further, the signal beam 23a passes through a Fourier transform lens 27 so that the information signal undergoes Fourier transform, and so converges in the recording medium 10 as to form crossover light.

The reference beam 23b, split by the beam splitter 24, is sequentially reflected and guided toward the recording medium 10 by reflecting mirrors 28a and 28b. The reflecting mirror 28b is so adjusted that the reference beam 23b crosses the signal beam 23a in front of or at the back of the position of the crossover light formed by the signal beam 23a. The position of the gating-beam source 11 is so adjusted that the gating beam 11a is irradiated in the vicinity of this crossing position.

The signal beam, 23a and the reference beam 23b interfere with each other at the crossing position, thus forming an interference pattern. This interference pattern is recorded on the recording medium 10.

Recording information signals using spatial multiplexing and angular multiplexing can increase the recording density of the recording medium 10. When the recording medium 10 is moved horizontally in the direction of the arrow A by the controller 41, the position of the interference pattern formed by the reference beam and the signal beam with respect to the recording medium 10 changes to thereby ensure spatial-multiplexing based recording. As the recording medium 10 is rotated in the direction of the arrow B by the controller 41, the recording plane of the interference pattern is rotated, thereby ensuring angular-multiplexing based recording.

In a mode of reproducing recorded information, the gating-beam source 11 is turned off to stop irradiating the gating beam toward the recording medium 10. Further, the signal beam 23a is shielded by the SLM 26 so that it does not reach the recording medium 10. As only the reference beam 23b is irradiated on the recording medium 10, the interference pattern recorded in the recording medium 10 is reproduced as its diffracted light. This diffracted light is led through an inverse Fourier lens 30 for inverse Fourier transform, the diffracted light is converted to a pattern of light intensities. The light intensity pattern is supplied to a CCD (Charge Coupled Device) 31 where it is converted to an analog electric signal. This analog electric signal is then sent to a decoder 43. The decoder 43 converts the analog electric signal to a digital signal which is reproduced data.

Figure 3:
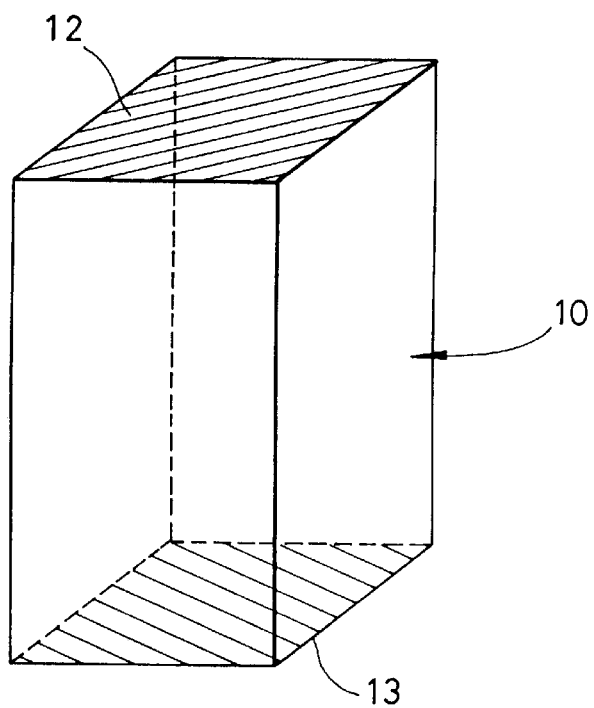
FIG. 3 is a perspective view showing another memory medium according to this invention.

As shown in FIG. 3, the recording medium 10 does not have to have a cylindrical shape. The recording medium 10 has only to be columnar with parallel top and bottom surfaces. For instance, the recording medium 10 may be a rectangular parallelepiped. In this case, the multiplexing recording is accomplished by making only the parallel movement of the recording medium 10 in the direction of the arrow B, not the rotational movement in the direction of the arrow A, under the control of the controller 41.

Figure 2:
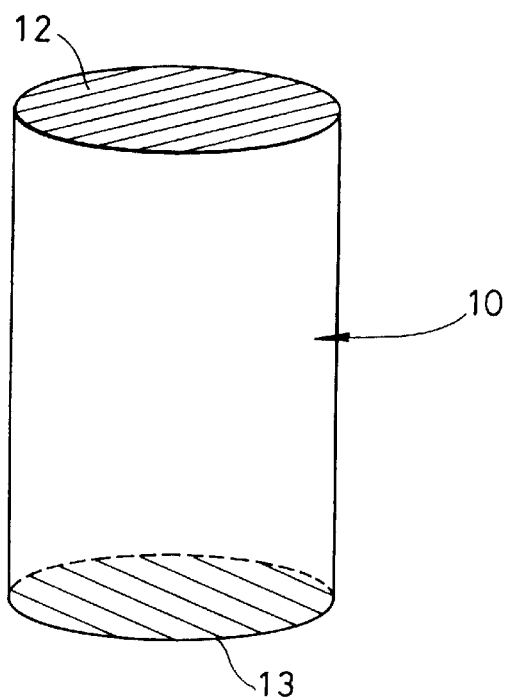
FIG. 2 is a perspective view showing a memory medium according to this invention.

As shown in FIGS. 2 and 3, an antireflection (AR) coat 12 which suppresses reflection of the gating beam 11a is formed on the surface of the recording medium 10 where the gating beam 11a enters and the top surface of the recording medium 10. A light-absorptive coat 13 which is capable of absorbing the gating beam 11a is formed on the surface of the recording medium 10 from which the gating beam 11a emerges or the bottom surface of the recording medium 10.

This structure can prevent such a phenomenon that part of the gating beam 11a irradiated on the recording medium 10 is reflected at the top of the recording medium 10 and is further reflected irregularly by the components of the recording apparatus to reach the recording medium 10 again. This structure can also suppress such a phenomenon that when the gating beam 11a once entered in the recording medium 10 passes through the recording medium 10 and emerges from the bottom thereof, part of the gating beam 11a is reflected there and is confined inside the recording medium 10.

Figure 4:
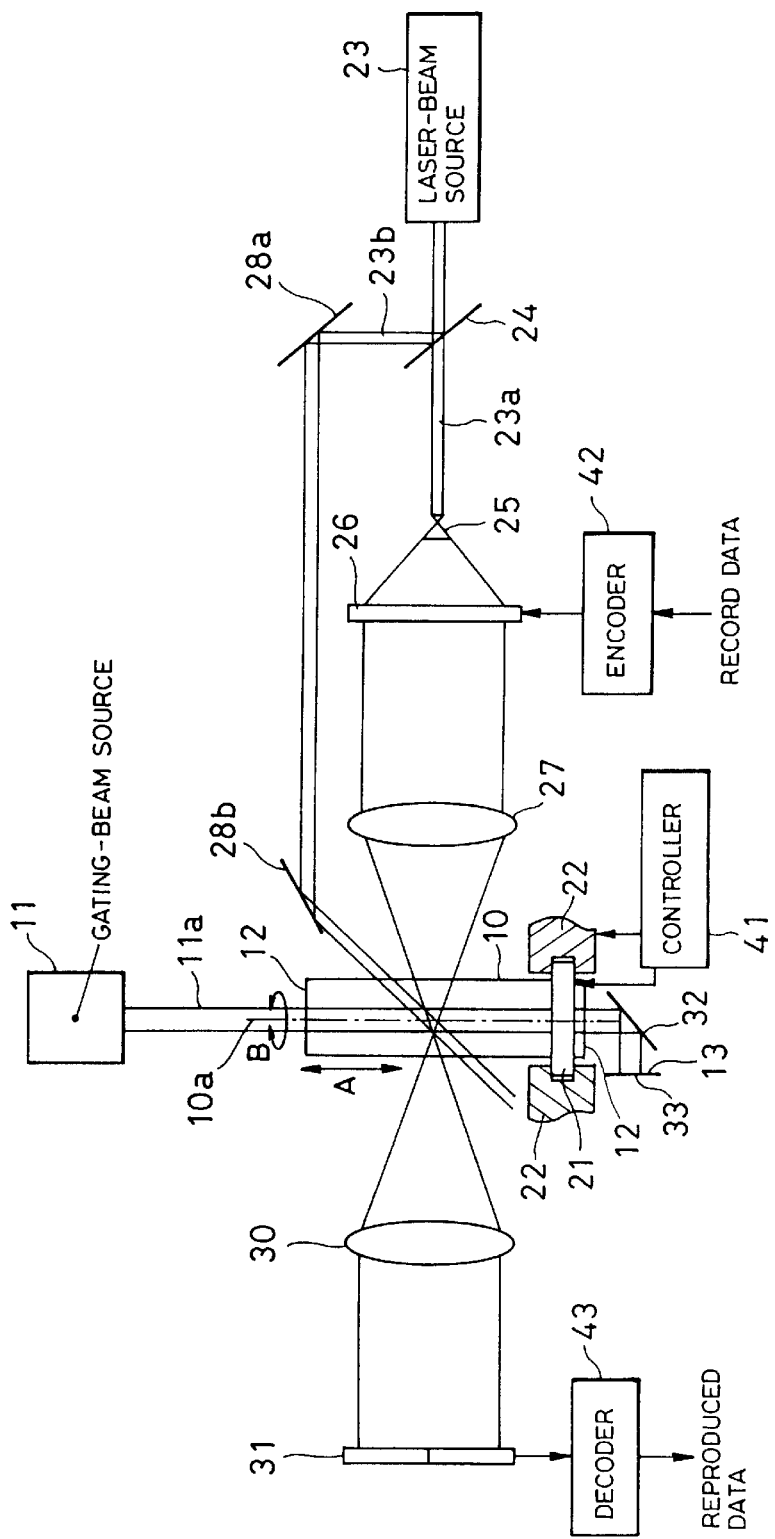
FIG. 4 is a structural diagram illustrating another recording apparatus embodying this invention.
Figure 5:
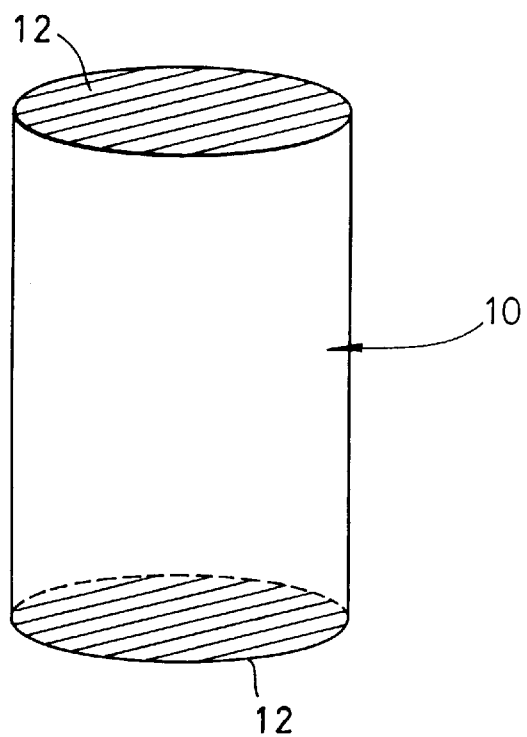
FIG. 5 is a perspective view showing a different memory medium according to this invention.
Figure 6:
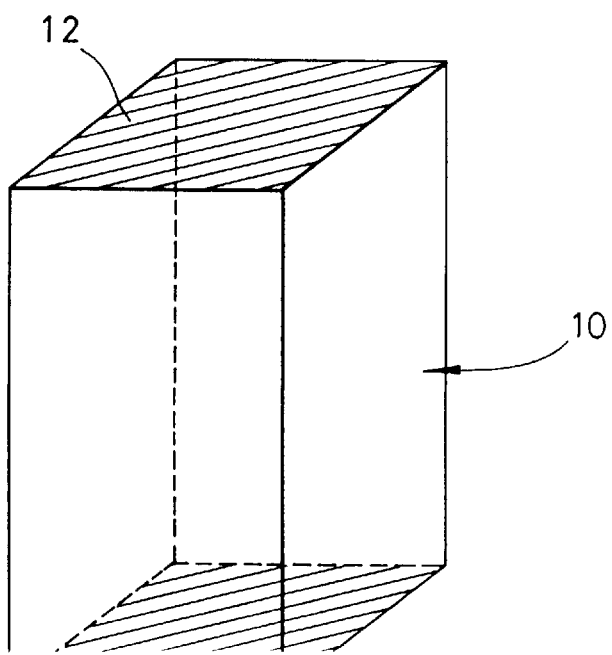
FIG. 6 is a perspective view showing a further memory medium according to this invention.

In a holographic memory device according to another embodiment of this invention shown in FIG. 4, the antireflection coat 12 is formed on both of the top surface of the recording medium 10 where the gating beam 11a enters and the bottom surface of the recording medium 10 from which the gating beam 11a emerges, as shown in FIG. 5 or FIG. 6. The shape of the recording medium 10 is not limited to a cylindrical shape or a rectangular parallelepiped shape, but can take any columnar shape with parallel top and bottom surfaces. A reflecting mirror 32 is disposed on the path on which the gating beam 11a emerges from the recording medium 10. This reflecting mirror 32 reflects and guides the gating beam 11a in a direction different from the direction toward the recording medium 10. A light-absorbing plate 33, which has the light-absorptive coat 13 formed on its surface, is disposed perpendicular to the light reflected by the reflecting mirror 32 and absorbs the gating beam 11a coming from the reflecting mirror 32.

This structure can prevent such a phenomenon that part of the gating beam 11a irradiated on the recording medium 10 is reflected at the top of the recording medium 10 and is further reflected irregularly by the components of the recording apparatus to reach the recording medium 10 again. This structure can also suppress such a phenomenon that when the gating beam 11a once entered in the recording medium 10 passes through the recording medium 10 and emerges from the bottom thereof, part of the gating beam 11a is reflected there and is confined inside the recording medium 10. Further, as the gating beam 11a is absorbed by the light-absorbing plate 33 located remote from the recording medium 10, the recording medium 10 is not affected by the heat that is generated by the light-absorptive coat 13 absorbing the gating beam 11a. This embodiment is preferable because of its ability to prevent heat-based deterioration of the recording medium 10.

It is to be noted that the light-absorbing member of the recording apparatus in FIG. 4 can suppress the generation of stray light whichever one of the recording media shown in FIGS. 2, 3, 5 and 6 is used.

Figure 7:
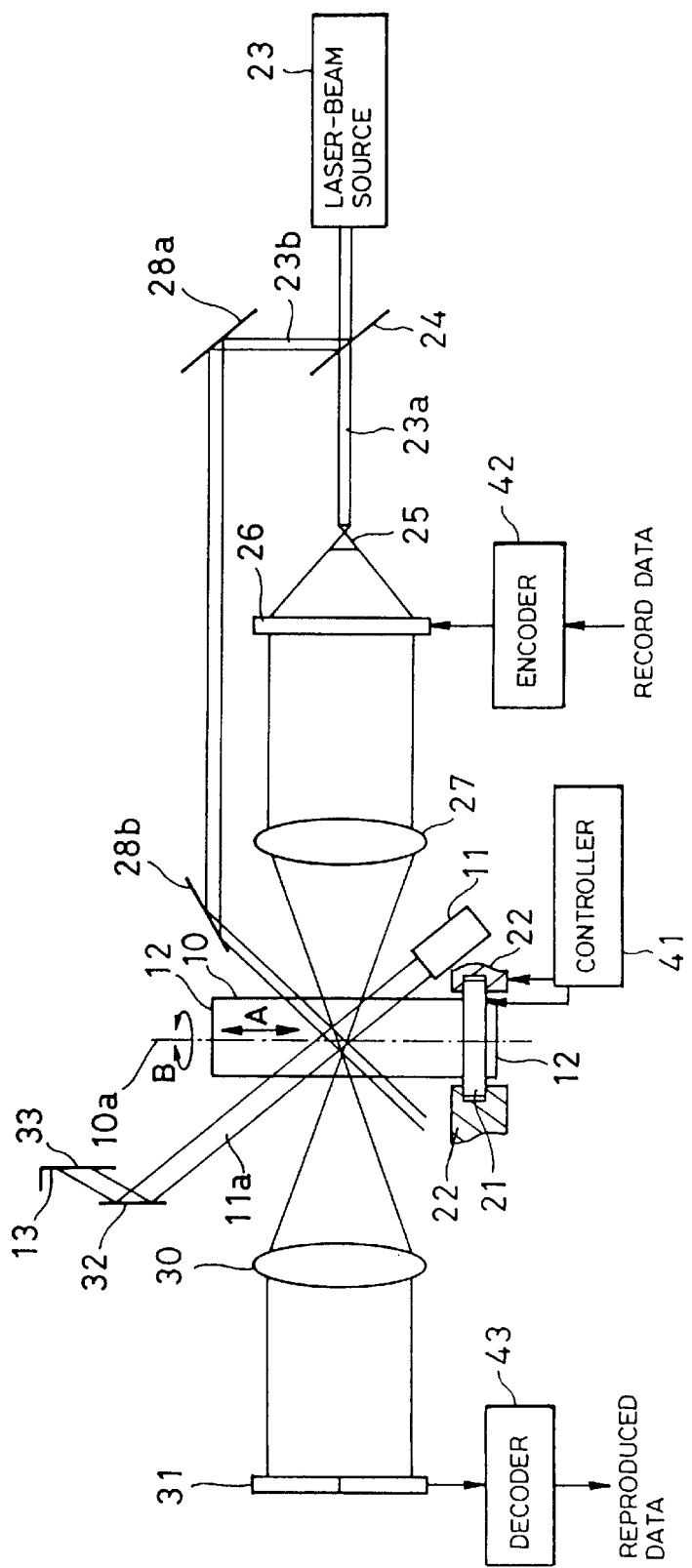
FIG. 7 is a structural diagram illustrating a further recording apparatus embodying this invention.

In a holographic memory device according to a further embodiment of this invention shown in FIG. 7, the recording medium 10 is cylindrical as shown in FIG. 5. The gating-beam source 11 is located on one side of the recording medium 10. The gating beam 11a enters the recording medium 10 from one side at a given angle to the center axis 10a of the recording medium 10, crosses the center axis 10a and comes out of the recording medium 10 from the opposite side to the incident side.

As shown in FIG. 5, the antireflection coat 12 is formed on the top and bottom surface of the recording medium 10 excluding the side surface. The reflecting mirror 32 is disposed on the path on which the gating beam 11a passing through the recording medium 10 emerges therefrom. This reflecting mirror 32 reflects the gating beam 11a in a direction different from the direction toward the recording medium 10. The light-absorbing plate 33 is disposed approximately perpendicular to the path of the reflected gating beam 11a. Formed on the light-absorbing plate 33 is the light-absorptive coat 13 which absorbs the gating beam 11a.

This structure can suppress such a phenomenon that when the gating beam 11a once entered in the recording medium 10 from one side portion passes through the recording medium 10 and emerges from the opposite side portion, part of the gating beam 11a is reflected there and is confined inside the recording medium 10. Further, as the gating beam 11a is absorbed by the light-absorbing plate 33 located remote from the recording medium 10, the recording medium 10 is not affected by the heat that is generated by the light-absorptive coat 13 absorbing the gating beam 11a. This embodiment is preferable because of its ability to prevent heat-based deterioration of the recording medium 10.

As apparent from the above, the holographic memory medium according to this invention and a recording apparatus using this medium can suppress stray light that is produced as the gating beam is scattered at the surface of the recording medium, and can therefore advantageously prevent information signals recorded on the recording medium from being unintentionally erased by such stray light.

What is claimed is:

1. A holographic memory medium for recording an information signal carried by a signal beam as said signal beam and a coherent reference beam entering said memory medium with a gating beam being present, said memory medium having at least a first surface and a second surface parallel to each other and comprising:

an antireflective coating formed on said first surface, for preventing reflection of said gating beam;

a light-absorptive coat formed on said second surface, for absorbing said gating beam.

2. The holographic memory medium according to claim 1, wherein said memory medium has a rectangular parallelepiped shape.

3. The holographic memory medium according to claim 1, wherein said memory medium has a cylindrical shape.

4. A recording apparatus for recording an information signal using a memory medium for recording said information signal carried by a signal beam as said signal beam and a coherent reference beam entering said memory medium with a gating beam being present, comprising:

an antireflective member for preventing reflection of said gating beam; and, a light absorbing member for absorbing said gating beam coming through said memory medium.

5. The recording apparatus according to claim 4, further comprising a reflecting mirror for temporarily reflecting said gating beam coming through said memory medium and directing said gating beam toward said light absorbing member.

6. A recording apparatus for recording an information signal using a memory medium for recording said information signal carried by a signal beam as said signal beam and a coherent reference beam entering said memory medium with a gating beam being present, comprising:

a light absorbing member for absorbing said gating beam coming through said memory medium; and, a reflecting mirror for temporarily reflecting said gating beam coming through said memory medium and directing said gating beam toward said light absorbing member.

7. The recording apparatus, according to claim 6, wherein said memory medium is a rectangular parallelepiped.

8. The recording apparatus, according to claim 6, wherein said memory medium is cylindrical.

\* \* \* \* \*